No. 667,954. Patented Feb. 12, 1901.
S. H. ROWLEY & T. TILL.
APPARATUS FOR MOLDING CLAY OR OTHER PLASTIC MATERIAL.
(Application filed July 21, 1899.)
(No Model.) 5 Sheets—Sheet 1.

WITNESSES: INVENTORS:

No. 667,954. Patented Feb. 12, 1901.
S. H. ROWLEY & T. TILL.
APPARATUS FOR MOLDING CLAY OR OTHER PLASTIC MATERIAL.
(Application filed July 21, 1899.)
(No Model.) 5 Sheets—Sheet 2.

WITNESSES: INVENTORS:
Samuel Hunt Rowley & Thomas Till
By their Attorneys

No. 667,954. Patented Feb. 12, 1901.
S. H. ROWLEY & T. TILL.
APPARATUS FOR MOLDING CLAY OR OTHER PLASTIC MATERIAL.
(Application filed July 21, 1899.)
(No Model.) 5 Sheets—Sheet 3.

WITNESSES: INVENTORS:

No. 667,954. Patented Feb. 12, 1901.
S. H. ROWLEY & T. TILL.
APPARATUS FOR MOLDING CLAY OR OTHER PLASTIC MATERIAL.
(Application filed July 21, 1899.)
(No Model.) 5 Sheets—Sheet 4.

WITNESSES: INVENTORS:
Samuel Hunt Rowley and Thomas Till
By their Attorneys

No. 667,954. Patented Feb. 12, 1901.
S. H. ROWLEY & T. TILL.
APPARATUS FOR MOLDING CLAY OR OTHER PLASTIC MATERIAL.
(Application filed July 21, 1899.)
(No Model.) 5 Sheets—Sheet 5.

WITNESSES: INVENTORS:

UNITED STATES PATENT OFFICE.

SAMUEL HUNT ROWLEY AND THOMAS TILL, OF SWADLINCOTE, ENGLAND.

APPARATUS FOR MOLDING CLAY OR OTHER PLASTIC MATERIAL.

SPECIFICATION forming part of Letters Patent No. 667,954, dated February 12, 1901.

Application filed July 21, 1899. Serial No. 724,629. (No model.)

*To all whom it may concern:*

Be it known that we, SAMUEL HUNT ROWLEY and THOMAS TILL, of Swadlincote, England, have invented certain new and useful Improvements in Apparatus for Molding Articles in Clay or other Plastic Material, of which the following is a specification.

This invention has reference to apparatus for molding articles in plastic material, and more particularly in clay for the manufacture of articles of earthenware, and is more especially applicable to molding articles of irregular design.

According to this invention the articles are molded from a slab or sheet of plastic material by the coöperation of a revolving or rocking matrix, which may conveniently be in the form of a cylinder or cylindrical segment, and a pattern or mold which is moved in a rectilinear direction tangentially to a circle struck from the center of rotation of said matrix, or the mode of movement of the parts may be reversed—that is to say, the matrix may move in a rectilinear direction while the pattern rocks or revolves. The molding takes place in such a manner that only a slight width of the clay or plastic material is acted upon at one time, and consequently there is no risk of the pattern or mold being ruptured, cracked, or otherwise injured in the molding.

Figure 1:
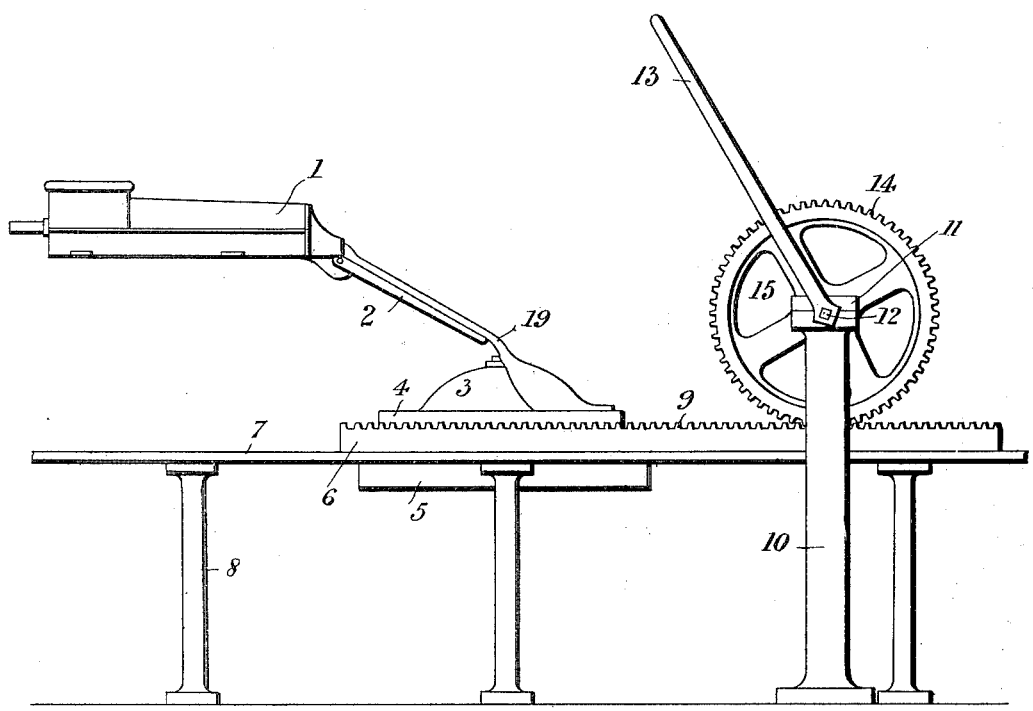
Figure 2:
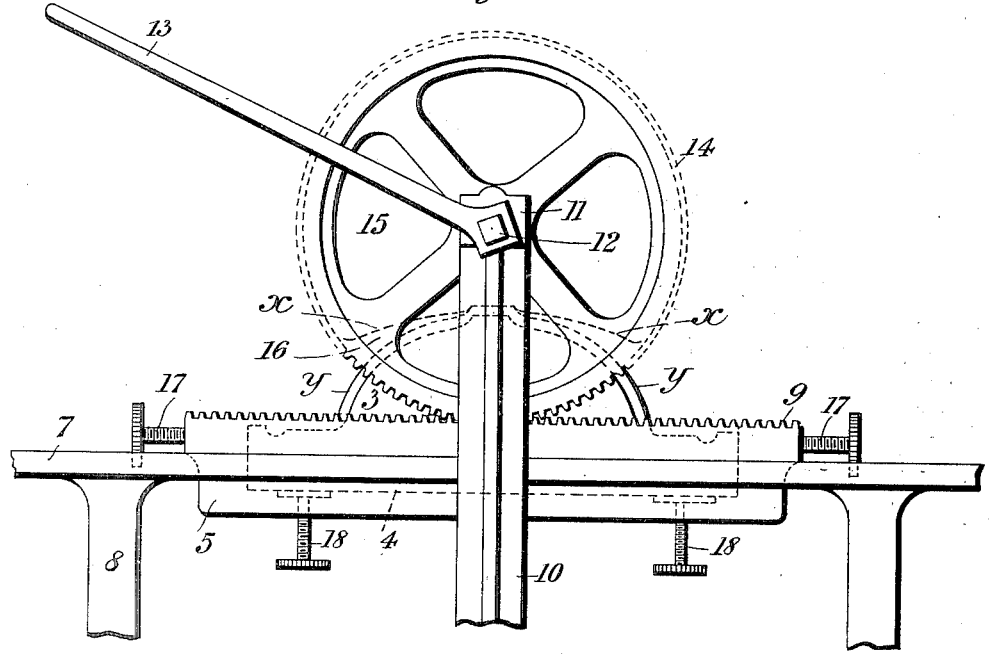
Figure 3:
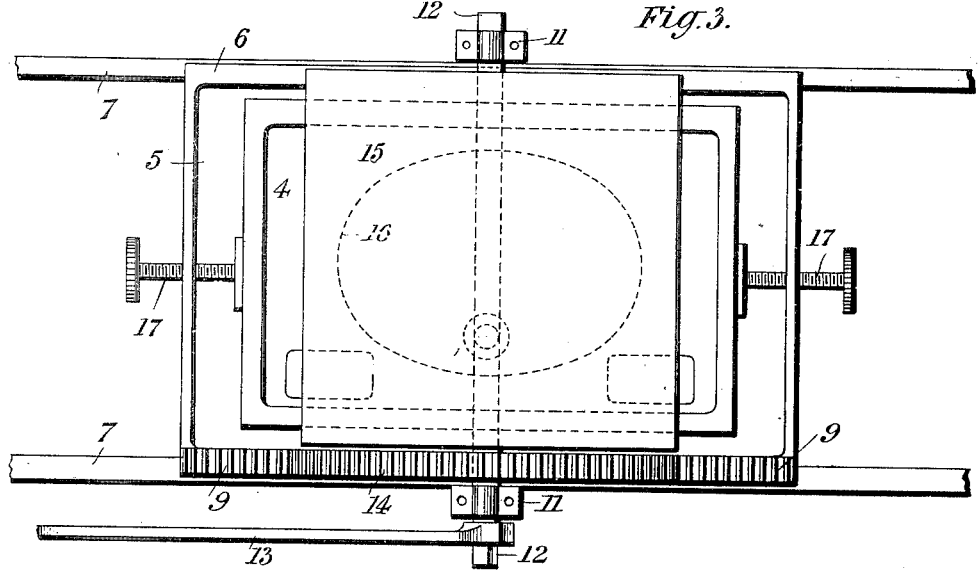
Figure 4:
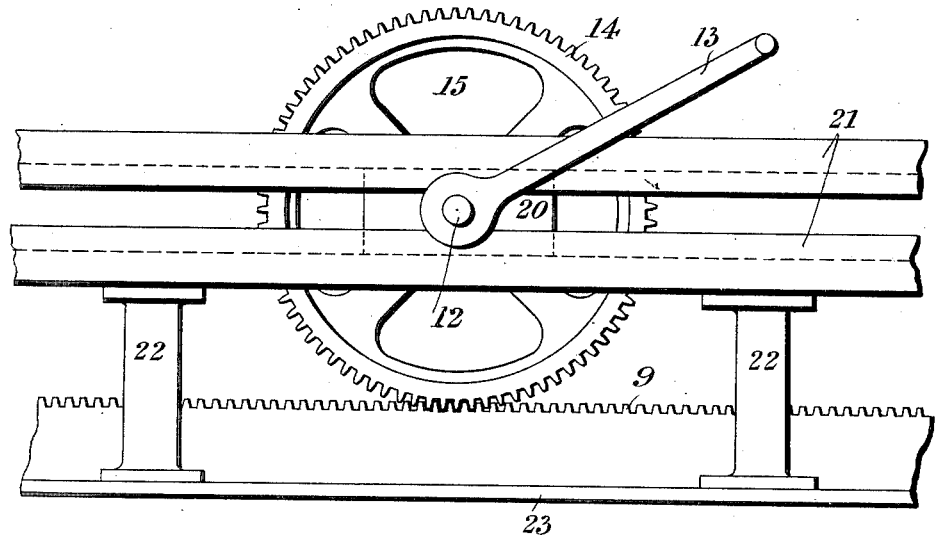
Figure 5:
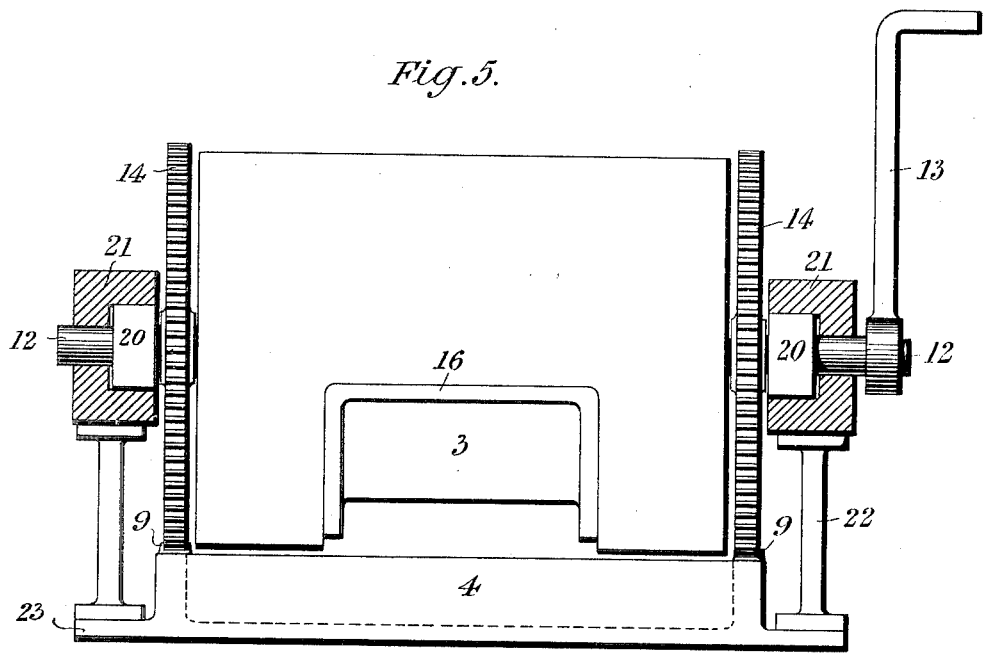
Figure 6:
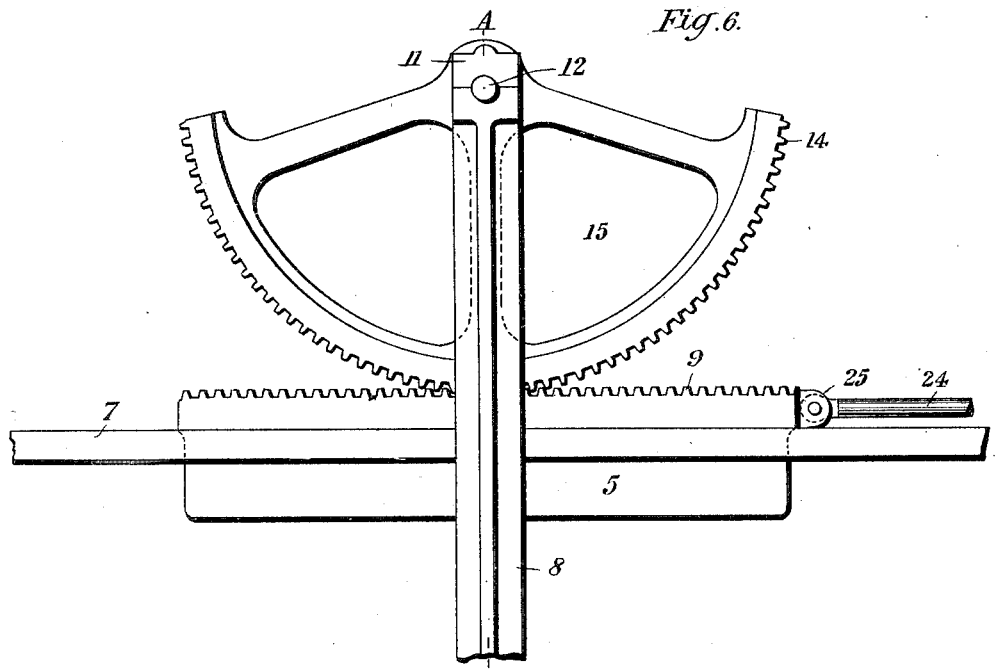
Figure 7:
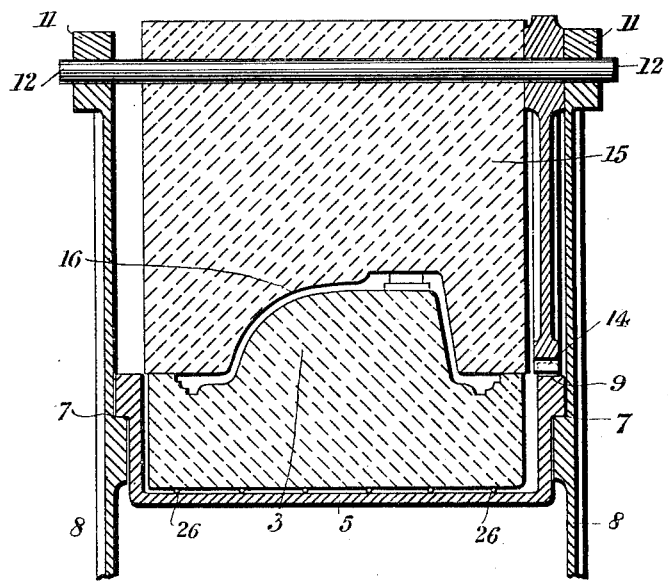
Figure 8:
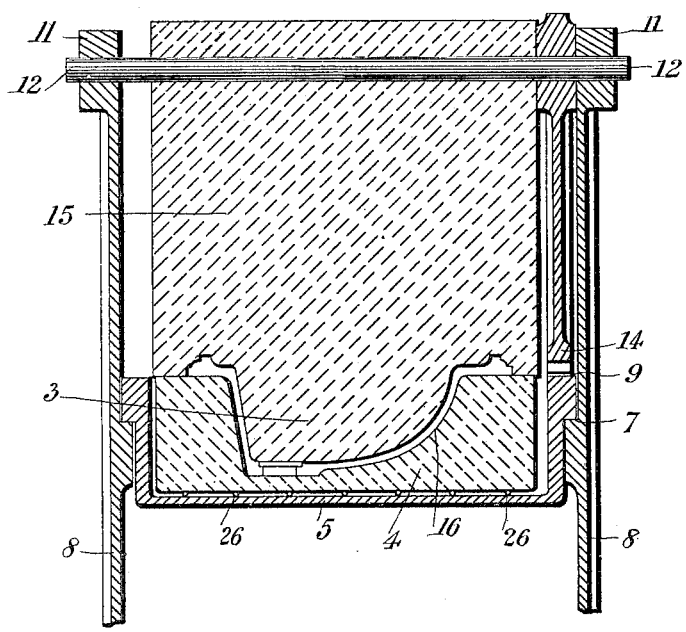

In the accompanying drawings, Figure 1 is a side elevation of a molding apparatus constructed in accordance with our invention working in conjunction with a pug-mill, the apparatus being shown with the pattern run out to receive clay or plastic material from the pug-mill. Fig. 2 is a partial side elevation of the molding apparatus without a pug-mill, the pattern being shown run in under the matrix. Fig. 3 is a plan of the molding apparatus. Fig. 4 is a partial side elevation of a modified form of the molding apparatus. Fig. 5 is an end view, partly in section, of the apparatus shown in Fig. 4. Fig. 6 is a partial side elevation of a further modification of the molding apparatus. Fig. 7 is a vertical cross-section on the line A B of Fig. 6. Fig. 8 is a vertical cross-section of a modification in which the arrangement of the molding parts is the reverse of that shown in Figs. 6 and 7. Fig. 1 is drawn to a smaller scale than the remaining figures.

Referring to Figs. 1, 2, and 3, 1 is the pug-mill with delivery-plate 2, and 3 is a pattern or mold on which the article—say a lavatory-basin—to be produced is molded. The pattern or mold 3, which is of plaster or other material and is formed with a base or bed piece 4, is fixed convex side uppermost and carried in a cast-iron tray 5, formed on its two opposites sides with supporting-fillets 6, adapted to slide longitudinally on the slideways 7 of a framework 8, of metal, wood, or any suitable material. One of the fillets 6 is formed as a toothed rack 9. Two standards 10 carry at their upper ends in bearings 11 a horizontal rotary or rocking axle 12, adapted to be rotated or rocked by any suitable means. The drawings show this to be effected by a spanner or crank-handle 13. On the axle 12, inside and close to one of the bearings 11, is fixed a toothed wheel 14 gearing, with the rack 9. Between the toothed wheel 14 and the opposite bearing there is fixed on the same axle a cylinder 15, of plaster or other material, in the periphery of which there is formed the molding-cavity or matrix 16. The internal contour lines of this matrix in vertical sectional planes at right angles to the direction of the longitudinal travel of the matrix and pattern are envelops of the external contour lines of the finished molded article in the same planes, while the internal contour lines of the matrix 16 in vertical sectional planes parallel to the direction of the longitudinal travel of the matrix and pattern are curves produced by evolution from the corresponding external contour lines of the finished molded article—that is to say, the internal contour line of the matrix in any plane of longitudinal section will be a curve adapted to roll and at the same time to slide or slip over the corresponding external contour line of the finished molded article. In Fig. 2 the dotted line $x\ x$ represents the internal contour line of the matrix 16, corresponding to the external contour line $y\ y$ of the finished molded article.

Adjustment horizontally of the bed 4 is effected by means of screw-spindles 17 17, working in the ends of the tray 5, and vertical adjustment of the bed 4, for the purpose of controlling the thickness of the walls of the finished molded article, is effected by means of screw-spindles 18 18, working through the bottom of the tray 5, or the fixing of the mold 3 may be arranged by bed or wedges in the tray 5.

The mode of working is as follows: The pattern or mold 3 is run out by rotating the handle 13 either to the pug-mill spout-plate 2 to receive a slab or sheet 19 of plastic material, as indicated in Fig. 1, or, where there is no pug-mill adjacent, to a sufficient distance to clear the cylinder 15, so as to allow of a slab or a sheet of clay or plastic material being applied to the pattern 3 by hand. When the pattern 3 is entirely covered with the plastic material, it is then run back by rotating the handle 13 in the reverse direction under the cylinder 15, so that the mold, with clay 19, is carried in a rectilinear direction in contact with the revolving matrix, whereby the molding of the article to be produced is effected. The mold 3 may be passed more than once under the matrix, if found desirable.

In Figs. 4 and 5 the pattern-tray is stationary and the molding-cylinder 15 travels over it. For this purpose the cylinder-axle 12 is carried at or near each end in a slide-block 20, working in a slide 21, carried on pillars 22, bolted to a fixed framing 23, to which also the rack 9 of the stationary tray is fixed. In this arrangement a rack 9 is provided at each side of the tray-gearing with a toothed wheel 14, fixed on the axle 12 at each end of the cylinder 16.

In Figs. 6 and 7 the molding-segment 15 is capable of rocking or rotating only through an angle of approximately ninety degrees to either side of the central vertical plane of its axle 12. 16 is the matrix or molding-cavity. The pattern or mold 3 is carried in a tray 5, adapted to move horizontally to and fro on slideways 7, formed on a fixed framing 8. On one side of the tray there is formed a rack 9, gearing with a toothed sector 14, fixed on the axle 12. To-and-fro motion is imparted to the tray 5 by means of a rod 24, which is pinned in an eye 25, cast on one end of the tray and to which to-and-fro motion is imparted by any suitable means.

In Fig. 8 the pattern or mold 3 is formed on the molding-segment 15, which rocks, and the matrix or molding-cavity 16 is formed in the bed-piece 4, which is carried in the tray 5, that moves horizontally to and fro.

The matrix or molding-cavity may in all cases, if desired, be formed in a separate piece fitting removably in the molding-cylinder, so that the matrix can be readily replaced by another of different design.

The pattern or mold is also removably fixed to the bed or tray.

In some cases a cushion in the form of india-rubber tubes 26 or otherwise may be put in the bottom of the tray to diminish the liability of the mold or pattern cracking under pressure.

What we claim, and desire to secure by Letters Patent, is—

1. In apparatus for molding hollow articles, the combination with a matrix, a pattern adapted to coöperate therewith, and means for imparting rotary motion to one of said parts, the contour of said rotary part being in any longitudinal plane of a configuration adapted to roll upon one of the sides of the molded article with a slipping motion, and in any transverse plane the shape of the corresponding contour of the molded article, and the contour of the other of said parts being of the same configuration as the other side of the molded article.

2. In apparatus for molding hollow articles in plastic material, the combination of a rotary matrix whose internal contour in any longitudinal plane is a curve adapted to roll on the corresponding external contour of the molded article with a slipping motion, and in any transverse plane is an outer envelop of the corresponding external contour of the molded article, with a pattern adapted to coöperate with said matrix and the coöperating surface of which is an inner envelop of the inner surface of the molded article, substantially as set forth.

3. In apparatus for molding hollow articles in plastic material, the combination of a rotary cylinder having in its periphery a matrix or molding-cavity whose internal contour in any longitudinal plane is a curve adapted to roll on the corresponding external contour of the molded article with a slipping motion, and in any transverse plane is an outer envelop of the corresponding external contour of the molded article, means for rotating said cylinder, a pattern adapted to coöperate with said matrix and the coöperating surface of which is an inner envelop of the inner surface of the molded article, and means for moving said pattern at substantially the same surface speed as the matrix, substantially as set forth.

4. In apparatus for molding hollow articles in plastic material, the combination of a cylinder having in its periphery a matrix or molding-cavity whose internal contour in any longitudinal plane is a curve adapted to roll on the corresponding external contour of the molded article with a slipping motion and in any transverse plane is an outer envelop of the corresponding external contour of the molded article, a rotary axle on which said cylinder is fixed, a toothed wheel on said axle, a pattern adapted to coöperate with said matrix, and whose coöperating surface is an inner envelop of the inner surface of the molded article, a support for said pattern having a slide on each side and a rack on one side engaging with said toothed wheel, and a framework with slideways to receive said slides, whereby when the said axle is rotated, the said support is moved with the pattern to bring and press plastic material between the matrix and pattern to mold the hollow article, substantially as set forth.

5. In molding apparatus, a support for the article to be molded, a matrix, and means for producing a relative movement of said parts whereby the matrix rotates along the support, the matrix having a contour shaped to slip along the contour of the article to be molded.

In witness whereof we have hereunto signed our names in the presence of two subscribing witnesses.

SAMUEL HUNT ROWLEY.
THOMAS TILL.

Witnesses:
JOHN HARRISON,
ANNIE ELIZABETH ELEY.